(12) United States Patent
Qu et al.

(10) Patent No.: US 11,646,817 B2
(45) Date of Patent: May 9, 2023

(54) PDCCH MONITORING FOR LOW POWER CONSUMPTION FOR NARROW BAND INTERNET OF THINGS

(71) Applicant: MediaTek Singapore Pte. Ltd., Singapore (SG)

(72) Inventors: Wenze Qu, Beijing (CN); Po-Ying Chen, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 42 days.

(21) Appl. No.: 16/649,300

(22) PCT Filed: Oct. 17, 2017

(86) PCT No.: PCT/CN2017/106569
§ 371 (c)(1),
(2) Date: Mar. 20, 2020

(87) PCT Pub. No.: WO2019/075641
PCT Pub. Date: Apr. 25, 2019

(65) Prior Publication Data
US 2020/0280393 A1    Sep. 3, 2020

(51) Int. Cl.
*H04W 52/02*    (2009.01)
*H04L 1/00*    (2006.01)
(Continued)

(52) U.S. Cl.
CPC ......... *H04L 1/0038* (2013.01); *H04B 17/336* (2015.01); *H04L 1/0061* (2013.01);
(Continued)

(58) Field of Classification Search
CPC . H04L 1/0038; H04L 1/0061; H04L 25/0202; H04L 5/0053; H04B 17/336;
(Continued)

(56) References Cited

U.S. PATENT DOCUMENTS 10,117,268 B2    10/2018    Patel et al.
10,517,070 B2    12/2019    Seo et al.
(Continued)

FOREIGN PATENT DOCUMENTS

CN    103701564 A    4/2014
CN    106489246 A    3/2017
(Continued)

OTHER PUBLICATIONS

Extended European Search Report dated Mar. 18, 2021, issued in application No. EP 17929238.8.
(Continued)

*Primary Examiner* — Peter P Chau
(74) *Attorney, Agent, or Firm* — McClure, Qualey & Rodack, LLP

(57) ABSTRACT

A method of narrowband physical downlink control channel (NPDCCH) monitoring with early decoding and reduced monitoring is proposed. Instead of blind decoding the NPDCCH at the end of each decoding instance, the UE tries to decode the NPDCCH at early decoding instances as well. The early decoding instances are determined based on the SNR of a received radio signal. Once NPDCCH is successfully decoded, UE stops the RF module. Furthermore, the UE skips some subframes for NPDCCH monitoring within each blind decoding interval, and turns on the RF only for synchronization and channel estimation purpose outside an NPDCCH monitoring length. The NPDCCH monitoring length is also determined based on the SNR of the received radio signal. By applying early decoding and reduced monitoring, UE power consumption can be reduced.

17 Claims, 6 Drawing Sheets

(51) Int. Cl.
*H04B 17/336* (2015.01)
*H04W 4/80* (2018.01)
*H04W 24/08* (2009.01)
*H04W 56/00* (2009.01)
*H04W 72/23* (2023.01)

(52) U.S. Cl.
CPC ............ *H04W 4/80* (2018.02); *H04W 24/08* (2013.01); *H04W 52/0229* (2013.01); *H04W 56/001* (2013.01); *H04W 72/23* (2023.01)

(58) Field of Classification Search
CPC ... H04W 4/80; H04W 24/08; H04W 52/0229; H04W 56/001; H04W 72/042; H04W 52/0225; H04W 52/0274; H04W 52/028; H04W 52/0283; H04W 52/0219; H04W 52/0245; H04W 52/0216; Y02D 30/70
See application file for complete search history.

(56) References Cited

U.S. PATENT DOCUMENTS

| | | | |
|---|---|---|---|
| 11,083,003 B2 | 8/2021 | Xiong et al. | |
| 2012/0281566 A1 | 11/2012 | Pelletier et al. | |
| 2013/0183987 A1 | 7/2013 | Vrzic et al. | |
| 2013/0301508 A1 | 11/2013 | Almog et al. | |
| 2014/0080537 A1* | 3/2014 | Udupa Sripathi | H04W 52/241 455/522 |
| 2016/0036617 A1 | 2/2016 | Luo et al. | |
| 2016/0316462 A1 | 10/2016 | Kim et al. | |
| 2017/0181135 A1 | 6/2017 | Chen et al. | |
| 2017/0201982 A1 | 7/2017 | Rico Alvarino et al. | |
| 2017/0265171 A1 | 9/2017 | Rico Alvarino et al. | |
| 2019/0028221 A1* | 1/2019 | Ratasuk | H04L 1/0038 |
| 2019/0036647 A1* | 1/2019 | Gowda | H04W 52/0229 |
| 2019/0174529 A1* | 6/2019 | Tie | H04W 4/70 |
| 2020/0077338 A1* | 3/2020 | Sui | H04W 52/0229 |
| 2020/0288491 A1 | 9/2020 | Liu et al. | |

FOREIGN PATENT DOCUMENTS

| | | |
|---|---|---|
| CN | 106716904 A | 5/2017 |
| CN | 106921478 A | 7/2017 |
| EP | 3 182 634 A1 | 6/2017 |
| WO | 2016/068667 A1 | 5/2016 |
| WO | 2017/136004 A1 | 8/2017 |

OTHER PUBLICATIONS

International Search Report dated Jul. 9, 2018, issued in application No. PCT/CN2017/106569.
Chinese language office action dated Nov. 7, 2019, issued in application No. TW 107136513.
"On design of search space for short PDCCH;" 3GPP TSG-RAN WG1 Meeting #86bis, R1-1609324; Oct. 2016 pp. 1-6.
"Discussion on sPDCCH design for sTTI;" 3GPP TSG-RAN WG1 Meeting #86bis, R1-1608913; Oct. 2016; pp. 1-3.
"Remove [] from UE Cat M1 MPDCCH demodulation SNR values;" 3GPP TSG-RAN4 Meeting #82, R4-1700618; Feb. 2017; pp. 1-5.
Chinese language office action dated Aug. 24, 2022, issued in application No. CN 201780076150.2.
Qualcomm Incorporated; "R1-152763 Physical Downlink Control Channels;" 3GPP TSG RAN WG1 #81; May 2015; pp. 1-5.

* cited by examiner

| NPDCCH length | | 1 | 4 | 64 | 256 |
|---|---|---|---|---|---|
| SNR threshold | 1 antenna port | 20 | 10 | 5 | -5 |
| | 2 antenna port | 10 | 5 | 0 | -10 |

[R] = min (Rmax/8, NPDCCH length)

PDCCH MONITORING FOR LOW POWER CONSUMPTION FOR NARROW BAND INTERNET OF THINGS

FIELD OF INVENTION

The disclosed embodiments relate generally to physical downlink control channel (PDCCH) monitoring, and, more particularly, to PDCCH monitoring for low power consumption for Narrow Band Internet of Things (NB-IoT).

BACKGROUND OF THE INVENTION

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for dynamic downlink scheduling. Typically, PDCCH can be configured to occupy the first one, two, or three OFDM symbols in a subframe.

Narrowband IoT (NB-IoT) is a Low Power Wide Area Network (LPWAN) radio technology standard that has been developed to enable a wide range of devices and services to be connected using cellular telecommunications bands. NB-IoT is a narrowband radio technology designed for the Internet of Things (IoT), and is one of a range of Mobile IoT (MIoT) technologies standardized by the 3GPP. The physical structure of physical downlink control channel for NB-IoT needs to be addressed. In one example, narrowband PDCCH (NPDCCH) spans both first and second slots in the region of legacy Physical Downlink Shared Channel (PDSCH). A plurality of physical resource blocks (PRBs) is allocated for NPDCCH transmission that carry downlink control information (DCI). An NPDCCH is encoded and occupies multiple narrowband control channel elements (NCCEs) based on aggregation level. In a preferred embodiment, each PRB pair for NPDCCH occupies two NCCEs.

In order to decode NPDCCH targeted specifically to a UE, the UE needs to find out where its NPDCCH is. In the so-called "blindly" decoding process, the UE must try a number of candidate NPDCCHs before knowing which NPDCCH is targeted for itself. The allocated radio resources of the candidate NPDCCHs may be distributed or localized. In addition, the NPDCCHs may constitute a common search space (CSS) or a UE-specific search space (UESS). As a result, the aggregated radio resources of candidate NPDCCHs for different UEs may be different. In other words, NPDCCH may be UE-specific and it is beneficial for blind decoding. With UE-specific NPDCCH search space, the size of search space for each UE can be reduced for smaller number of blind decoding candidates.

The UE-specific NPDCCH search space can be represented by a set of parameters {AL, Ri, C}. Parameter AL indicates the aggregation level, e.g., the number of NCCEs per NPDCCH. If AL=1, then it means that each NPDCCH occupies one NCCE in half subframe. If AL=2, then it means that each NPDCCH occupies two NCCEs in one subframe. Parameter Ri indicates the repetition number of NPDCCH repetition, with a maximum number of repetition defined as Rmax. Parameter C indicates the number of blind decoding for candidate NPDCCHs of the NPDCCH search space. For an NPDCCH candidate with number of repetition Ri, UE needs to blind decode every Ri valid subframes from the start of the search space to the end of the search space. In other words, UE needs to monitor the whole NPDCCH search space, since the target NPDCCH may be one of candidates within Rmax valid subframes. For large Rmax, NPDCCH monitoring may last long time. Moreover, UE has to monitor the whole NPDCCH search space even when there is no corresponding NPDSCH. A solution is sought to reduce the unnecessary power consumption of NPDCCH monitoring.

SUMMARY OF THE INVENTION

A method of narrowband physical downlink control channel (NPDCCH) monitoring with early decoding and reduced monitoring is proposed. Instead of blind decoding the NPDCCH at the end of each decoding instance, the UE tries to decode the NPDCCH at early decoding instances as well. The early decoding instances are determined based on the SNR of a received radio signal. Once NPDCCH is successfully decoded, UE stops the RF module. Furthermore, the UE skips some subframes for NPDCCH monitoring within each blind decoding interval, and turns on the RF only for synchronization and channel estimation purpose outside an NPDCCH monitoring length. The NPDCCH monitoring length is also determined based on the SNR of the received radio signal. By applying early decoding and reduced monitoring, UE power consumption can be reduced.

In one embodiment, the UE receives a control signal. The control signal is carried by a narrowband physical downlink control channel (NPDCCH) allocated in a NPDCCH search space divided into a plurality of predefined blind decoding intervals. The UE determines a NPDCCH monitoring length based at least in part on a signal to noise ratio (SNR) of a received radio signal. The UE decodes the NPDCCH from the radio signal. The UE monitors the control signal for each of the NPDCCH monitoring lengths within each blind decoding interval. The UE partially turns off a radio frequency (RF) chain until a next blind decoding interval if the NPDCCH decoding fails, and the UE completely turns off the RF chain until a next operation if the NPDCCH decoding succeeds.

In another embodiment, the UE comprising a memory, a processor and a radio frequency (RF) chain. The processor executes program instructions stored in the memory and thereby configures the RF chain to operate in one of the three states: a first state of entire ON for monitoring a control signal carried in a narrowband physical downlink control channel (NPDCCH), wherein the NPDCCH is allocated in a NPDCCH search space that is divided into a plurality of predefined blind decoding intervals, and wherein the UE monitors the control signal inside an NPDCCH monitoring length for each blind decoding interval; and a third state of entire OFF, wherein the UE completely turns off the RF chain until a next operation if the decoding succeeds.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
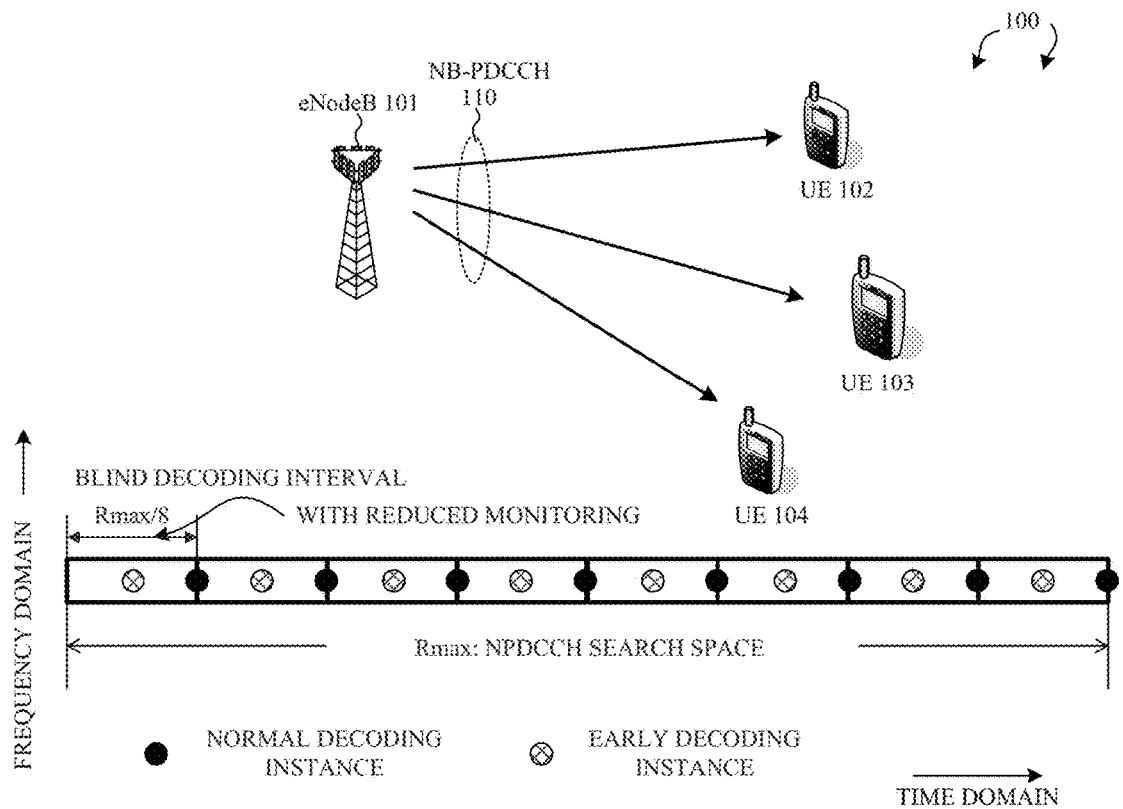
FIG. 1 illustrates a mobile communication network supporting a method for narrowband physical downlink control channel (NPDCCH) monitoring in accordance with one novel aspect.

FIG. 1 illustrates a mobile communication network 100 supporting a method for narrowband physical downlink control channel (NPDCCH) monitoring in accordance with one novel aspect. Mobile communication network 100 is an OFDM/OFDMA system comprising a base station eNodeB 101 and a plurality of user equipment UE 102, UE 103, and UE 104. When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI).

In the example of FIG. 1, a narrowband physical downlink control channel (NPDCCH) 110 is used for eNodeB 101 to send DCI to the UEs. In 3GPP LTE system based on OFDMA downlink, the radio resource is partitioned into subframes, each of which is comprised of two slots and each slot has seven OFDMA symbols along time domain. Each OFDMA symbol further consists of a number of OFDMA subcarriers along frequency domain depending on the system bandwidth. The basic unit of the resource grid is called Resource Element (RE), which spans an OFDMA subcarrier over one OFDMA symbol. A physical resource block (PRB) occupies one slot and twelve subcarriers, while a PRB pair occupies two consecutive slots in one subframe.

In order to decode NPDCCH targeted specifically to a UE, the UE needs to find out where its NPDCCH is. In the so-called "blindly" decoding process, the UE must try a number of candidate NPDCCHs before knowing which NPDCCH is targeted for itself. The NPDCCHs may constitute a common search space (CSS) or a UE-specific search space (UESS). As a result, the aggregated radio resources of candidate NPDCCHs for different UEs may be different. In other words, NPDCCH may be UE-specific and it is beneficial for blind decoding. With UE-specific NPDCCH, the size of search space for each UE can be reduced for smaller number of blind decoding candidates.

The UE-specific NPDCCH search space can be represented by a set of parameters {AL, Ri, C}. Parameter AL indicates the aggregation level. If AL=2, then it means that each NPDCCH occupies one subframe. Parameter Ri indicates the repetition number of NPDCCH repetition. Parameter C indicates the number of blind decoding for candidate NPDCCHs of the NPDCCH search space. For a large maximum number of repetition Rmax (e.g., Rmax>=8), UE monitors one of the following sets: {2, Rmax/8, 8}, {2, Rmax/4, 4}, {2, Rmax/2, 2}, and {2, Rmax, 1}. For an NPDCCH candidate with number of repetition Ri, UE needs to blind decode every Ri valid subframes from the start of the search space to the end of the search space. In other words, UE needs to monitor the whole NPDCCH search space, since the target NPDCCH may be one of candidates within Rmax valid subframes. For large Rmax: {1, 2, 4, 8, 16, 32, 64, 128, 256, 512, 1024, 2048}, NPDCCH monitoring may last long time. Moreover, UE has to monitor the whole NPDCCH search space even when there is no corresponding NPDSCH for data transmission/reception.

In accordance with one novel aspect, a method of NPDCCH monitoring with early decoding and reduced monitoring is proposed. In the example of FIG. 1, NPDCCH 110 is encoded and repeated in UE-specific search space for each UE, and then sent to the UEs. In one example, the traditional blind decoding instance is at the end of every blind decoding interval, e.g., every Rmax/8 subframes. Instead of blind decoding NPDCCH at the decoding instance, the UE tries to decode at the early decoding instance as well. Once NPDCCH is successfully decoded, UE stops the receiving RF chain. In addition, for every Rmax/8 subframes, the UE intentionally skips some subframes for NPDCCH monitoring within the NPDCCH search space. By applying early decoding and reduced monitoring, the power consumption of the UE can be reduced.

Figure 2:
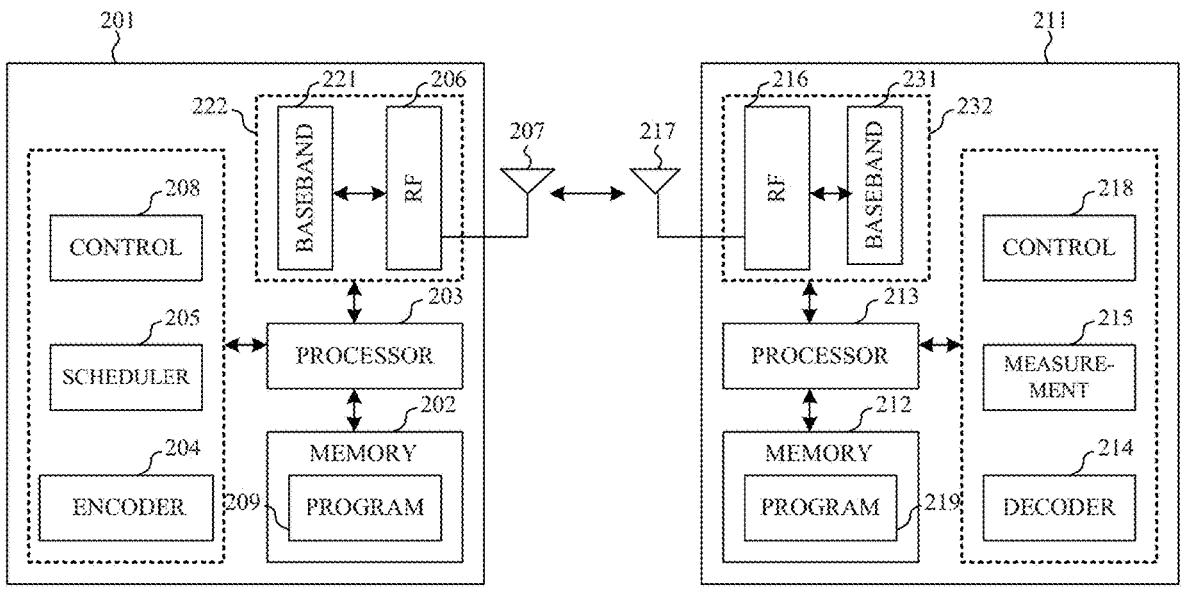
FIG. 2 illustrates simplified block diagrams of a base station and a user equipment in accordance with embodiments of the present invention.

FIG. 2 illustrates simplified block diagrams of a base station 201 and a user equipment 211 in accordance with embodiments of the present invention. For base station 201, transceiver 222 includes RF processing circuit 206 and baseband (BB) processing circuit 221, both of which may operated under control of processor 203. RF processing circuit 206, coupled with the antenna 207, processes the RF signals received from the antenna to generate baseband signals to be processed by baseband processing circuit 221. RF processing circuit 206 also processes the baseband signals received from the baseband signal processing circuit 221 to generate RF signals, and sends out to antenna 207. The RF processing circuit 206 may comprise a plurality of hardware elements to perform radio frequency conversions. For example, the RF processing circuit may comprise at least a part of a power amplifier, a mixer, analog-to-digital conversion (ADC)/digital-to-analog conversion (DAC), gain adjustment, or others, and the invention does not limited thereto. The baseband processing circuit 221 may also comprise a plurality of hardware elements to perform baseband signal processing. For example, the baseband signal processing may comprise at least a part of modulation/demodulation, encoding/decoding, and so on. Please be noted that the invention does not limited thereto. Note that, in the embodiments of the invention, the RF processing circuit 206 may be regarded as RF signal processing chain for receiving/transmitting and processing the RF signals. According to an embodiment of the invention, processor 203 may be arranged to execute the program codes of the software module(s) of the corresponding baseband processing circuit and/or the RF processing circuit to control both RF processing circuit 206 and BB processing circuit 221. In addition, processor 203 may invoke different functional modules and circuits to perform features in base station 201. Memory 202 stores program instructions and data 209 to control the operations of the base station.

Similar configuration and implementation exists in UE 211 where antenna 217 transmits and receives RF signals. Transceiver 232 includes RF processing circuit 216, and baseband (BB) processing circuit 231, both of which may operated under control of processor 213. RF processing circuit 216, coupled with the antenna 217, processes the RF signals received from the antenna 217 to generate baseband signals to be processed by baseband processing circuit 231. The RF processing circuit 216 also processes the baseband signals received from the baseband processing circuit to generate RF signals, and sends out to antenna 217. The RF processing circuit 216 may comprise a plurality of hardware elements to perform radio frequency conversions. For example, the RF processing circuit may comprise at least a part of a power amplifier, a mixer, analog-to-digital conversion (ADC)/digital-to-analog conversion (DAC), gain adjustment, or others, and the invention does not limited thereto. The baseband processing circuit 231 may also comprise a plurality of hardware elements to perform baseband signal processing. For example, the baseband signal processing may comprise at least a part of modulation/demodulation, encoding/decoding, and so on. Please be noted that the invention does not limited thereto. Note that, in the embodiments of the invention, the RF processing circuit 216 may be regarded as RF signal processing chain (RF chain) for receiving/transmitting and processing the RF signals. According to embodiments of the invention, processor 213 may be arranged to execute the program codes of the software module(s) of the corresponding baseband processing circuit and/or the RF processing circuit to control both RF processing circuit 216 and BB processing circuit 231. In addition, processor 213 may invoke different functional modules and circuits to perform features in UE 211. Memory 212 stores program instructions and data 219 to control the operations of the UE.

The base station 201 and UE 211 also include several functional modules and circuits to carry out embodiments of the present invention. The different functional modules and circuits can be configured and implemented by software, firmware, hardware, or any combination thereof. The function modules and circuits, when executed by the processors 203 and 213 (e.g., via executing program codes 209 and 219), for example, allow base station 201 to encode and transmit downlink control information to UE 211, and allow UE 211 to receive and decode the downlink control information accordingly. In one example, each functional module or circuit comprises a processor together with corresponding program codes.

In one example, base station 201 schedules downlink or uplink transmission via scheduler 205, configures a set of radio resource for NPDCCH transmission carrying downlink control information via control module 208. The downlink control information carried in NPDCCH is then modulated and encoded via encoder 204 to be transmitted by antenna 207. UE 211 receives the downlink control information by transceiver 232 via antenna 217. UE 211 determines the configured radio resource for NPDCCH transmission via control module 218 and measures the received radio signal strength via measurement module 215. UE 211 demodulates and decodes the downlink control information from the collected resource elements (REs) via decoder 214. In one advantageous aspect, UE 211 applies early decoding and reduced monitoring for enhanced NPDCCH monitoring to reduce power consumption. Specifically, the RF processing circuit of the transceiver can be turned on/off or partially turned off.

Figure 3:
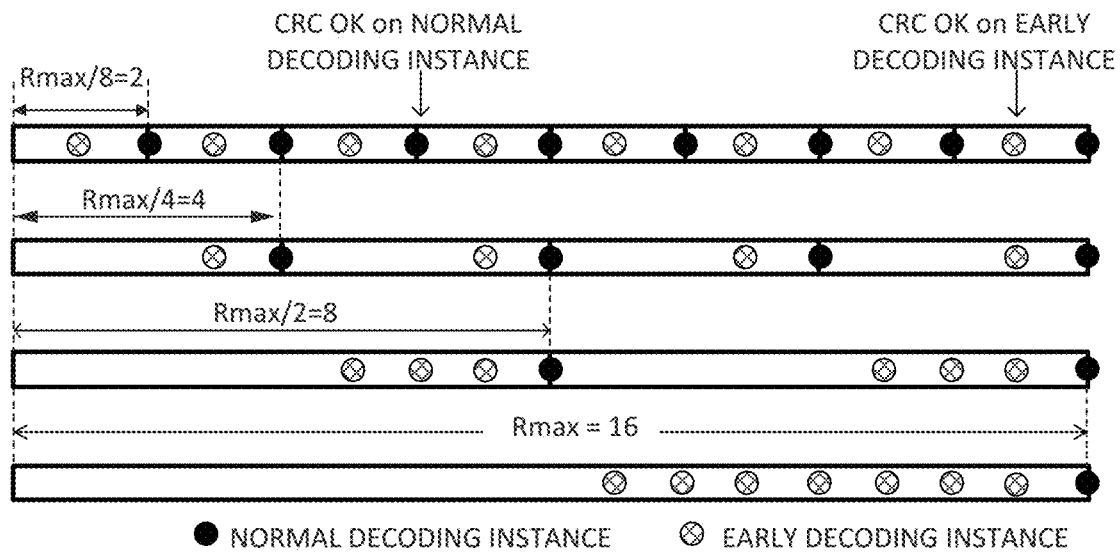
FIG. 3 illustrates a first embodiment of NPDCCH monitoring with early decoding.

FIG. 3 illustrates a first embodiment of NPDCCH monitoring with early decoding. NPDCCH early decoding is defined to stop the RF receiving chain as long as NPDCCH is successfully decoded (checked by CRC). For a large maximum number of NPDCCH repetition Rmax, UE monitors one of the following sets of NPDCCH search space {AL, Ri, C}: {2, Rmax/8, 8}, {2, Rmax/4, 4}, {2, Rmax/2, 2}, and {2, Rmax, 1}. FIG. 3 depicts the four different search spaces when Rmax=16 and the NPDCCH search space is Rmax=16 subframes. In the example of {AL=2, Ri=Rmax/8=2, C=8}, the number of repetition Ri=2, e.g., there are 2 NPDCCH repetition every Ri=2 subframes for each blind decoding interval, and there are total 8 blind decoding for 8 NPDCCH candidates. The normal decoding instance therefore occurs at the end of blind decoding interval of every Ri=2 subframes. In early decoding, the UE tries to decode NPDCCH every N subframe, where N is a configurable integer and is adjusted based on Rmax and the signal to noise ratio (SNR) of the receiving radio signal.

Note that the SNR may be SNR of the received radio signal before or after the NPDCCH blind decoding, or both. Furthermore, the SNR may be SNR of radio signals associated with NPDCCH, e.g., DCI, pilot signal, or other reference signals (RS). In one example, if Rmax=16 and if SNR is greater than a predefined threshold, then N=1; else N=2. In another example, if Rmax=32 and if SNR is greater than a first predefined threshold, then N=1; else if SNR is greater than a second predefined threshold, then N=2; else N=4. This is because if the SNR of the receiving radio signal quality is good, then it is more likely that the UE is able to successfully decode NPDCCH every single subframe with only one NPDCCH repetition. On the other hand, if the SNR of the receiving radio signal quality is poor, then it is more likely that the UE needs the entire blind decoding interval carrying two NPDCCH repetitions for successful decoding.

Figure 4:
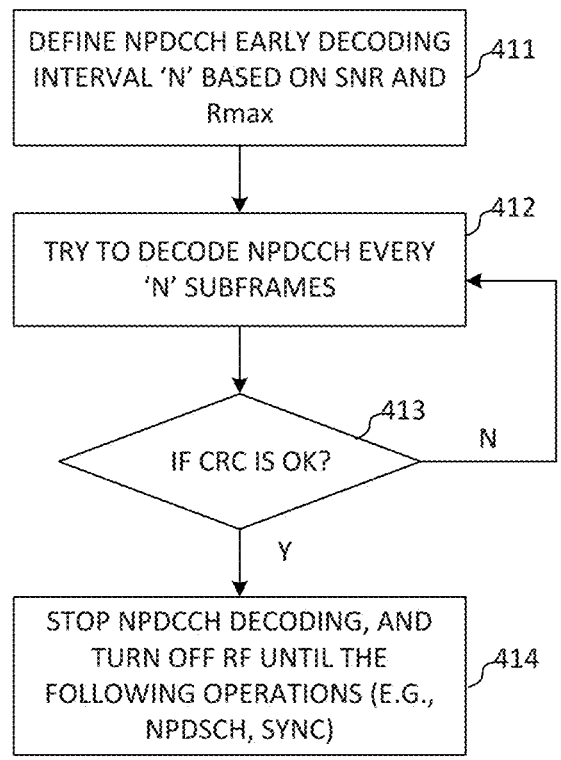
FIG. 4 illustrates a flow chart of early decoding for NPDCCH monitoring.

FIG. 4 illustrates a flow chart of early decoding for NPDCCH monitoring by a UE. In step 411, the UE determines NPDCCH early decoding interval N based on the maximum repetition number Rmax and the received radio signal quality SNR. Parameter Rmax can be obtained via signaling from the serving base station. Parameter SNR can be obtained via UE measurement and estimation. For example, if (SNR>threshold) && (Rmax=16), N=1; else, N=2. In step 412, the UE tries to decode NPDCCH every N subframes, starting from the beginning of the NPDCCH search space. In step 413, the UE checks if the CRC is OK for the DCI decoding. If the answer is no, then the UE goes back to step 412 and moves to the next subframe. If the answer is yes, then the UE goes to step 414 and stops NPDCCH decoding and turns off the RF receiving chain until the following operation, e.g., data transmission and reception for NPDSCH, synchronization etc. Note that if CRC OK happens on normal decoding instances, then the UE directly stops NPDCCH decoding. If CRC OK happens on early decoding instances, then the UE early terminates NPDCCH decoding and saves power consumption.

Figure 5:
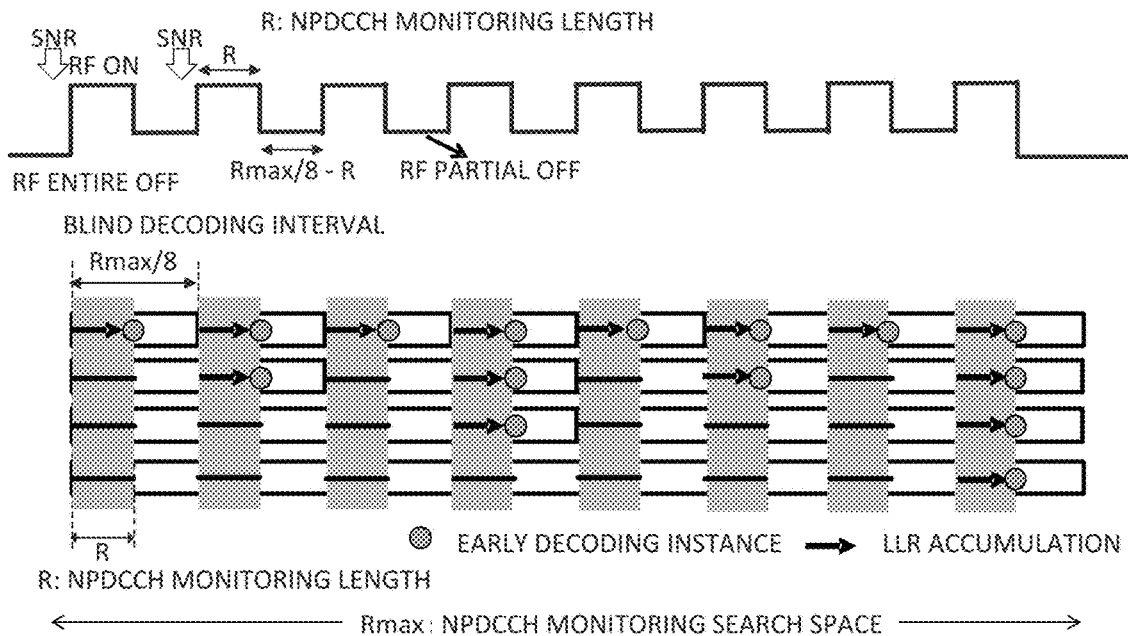
FIG. 5 illustrates a second embodiment of NPDCCH monitoring with reduced monitoring.

FIG. 5 illustrates a second embodiment of NPDCCH monitoring with reduced monitoring. Sometimes, there is only NPDCCH with no corresponding NPDSCH. Under NPDCCH-only case, UE may intentionally skip some subframes for NPDCCH monitoring during each blind decoding interval. For Rmax>16, the blind decoding interval is Rmax/8 subframes, which is at least Ri=2 two subframe length. NPDCCH monitoring can be reduced within the NPDCCH search space of every Rmax/8 subframes. Specifically, a NPDCCH monitoring length of R subframes is determined within the blind decoding interval. For the first R subframes of the Rmax/8 subframes, the UE RF chain is entirely ON for NPDCCH monitoring. For the remaining Rmax/8-R subframes of the Rmax/8 subframes, the UE RF chain is in partial OFF state to maintain synchronization and channel estimation functionally.

As depicted by FIG. 5, the UE RF is entire OFF before starting NPDCCH monitoring. The NPDCCH monitoring search space contains Rmax subframes and is divided into eight NPDCCH blind decoding intervals, each Rmax/8 subframes. For each Rmax/8 subframes, the UE RF is entire ON for the first R subframes and the UE monitors NPDCCH accordingly. At the end of the R subframes, the UE performs early decoding and log-likelihood ratio (LLR) accumulation. After the first R subframes, the UE RF is partial OFF for the remaining Rmax/8-R subframes and the UE stops monitoring NPDCCH. The UE only performs essential synchronization and channel estimation functionally during partial OFF to save power consumption. The UE RF is entire OFF upon successfully decoding of NPDCCH.

Figure 6:
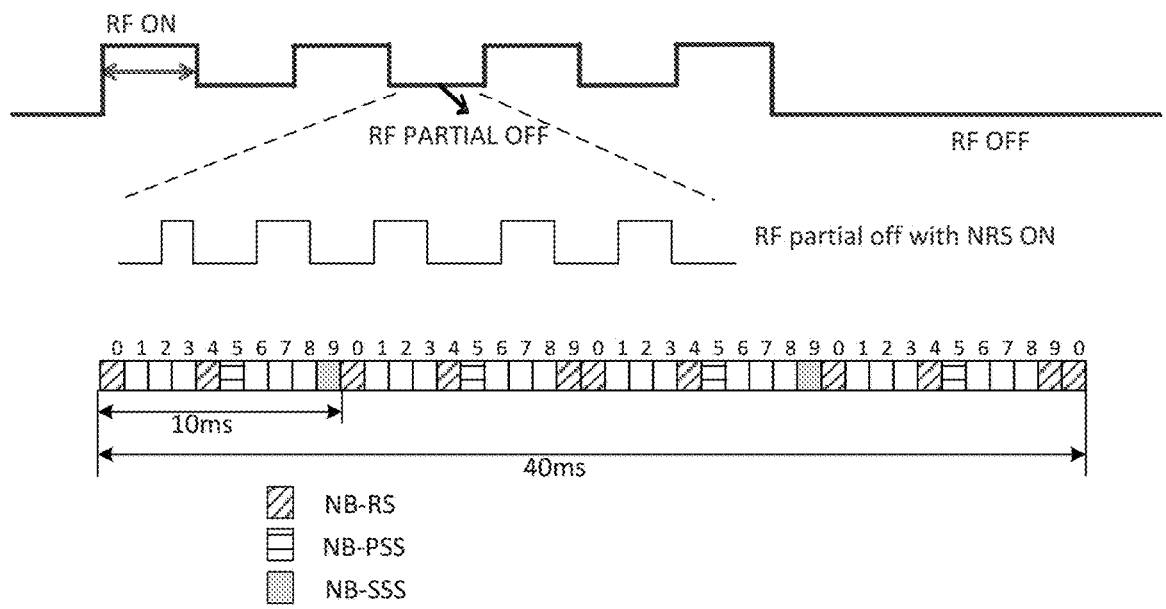
FIG. 6 illustrates a radio frequency module having three different states of entire ON, entire OFF, and partial OFF.

FIG. 6 illustrates a radio frequency module having three different states of RF ON, RF OFF, and RF partial OFF. For RF ON state, the RF chain is entire ON to transmit and receive all radio signals. For RF OFF state, the RF chain is entire OFF and stops transmitting or receiving all radio signals. For RF partial OFF state, the RF chain is only turned on for receiving reference signals (RS) in some subframes for the purpose of performing synchronization and/or channel estimation. As depicted in FIG. 6, during RF partial OFF, the RF chain is ON for receiving reference signals including NB-RS, NB-primary synchronization signal (PSS) and NB-secondary synchronization signal (SSS), while it is turned OFF otherwise. For example, during one radio frame, the RF chain is ON in subframes 0, 4, 5, and 9 for receiving NB-RS, NB-PSS and NB-SSS, and the RF chain is OFF in subframes 1, 2, 3, 6, 7, 8.

Figures 7, 8:
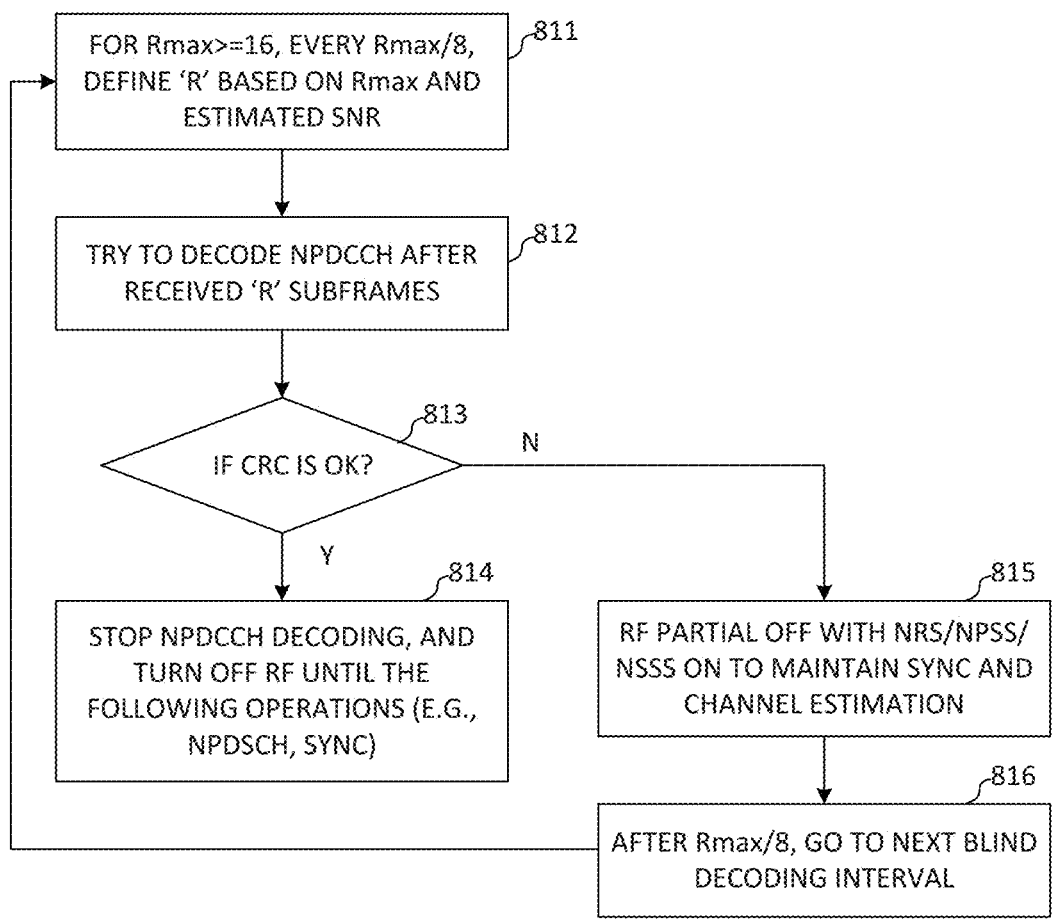
FIG. 7 illustrates one example for selecting NPDCCH monitoring length based on the signal to noise radio (SNR) and the maximum repetition number Rmax.
FIG. 8 is a flow chart of reduced monitoring for NPDCCH monitoring.

FIG. 7 illustrates one example for selecting NPDCCH monitoring length R based on the signal to noise radio (SNR) and the maximum repetition number Rmax. The NPDCCH monitoring length R can be dynamically determined by the UE. In one embodiment, the NPDCCH monitoring length R may be calculated based on the SNR and the maximum repetition number Rmax. In another embodiment, the UE may determine the NPDCCH monitoring length R according to a stored table, which defines the relationship of the NPDCCH monitoring length R, the SNR and the maximum repetition number Rmax. In the embodiment of FIG. 7, [R]=min(Rmax/8, NPDCCH length). The NPDCCH length in turns is dependent on the SNR threshold. Table 700 of FIG. 7 depicts the relationship between NPDCCH length and the SNR threshold respectively for UE having one antenna port and having two antenna ports. For example, the SNR threshold for UE having one antenna port is 10 dB, and the NPDCCH length is 4 subframes. If Rmax=64, and Ri=Rmax/8=8 subframes, then the NPDCCH monitoring length R=min(Rmax/8, NPDCCH length)=min(8, 4)=4 subframes.

FIG. 8 is a flow chart of reduced monitoring for NPDCCH monitoring by a UE when the maximum repetition number Rmax>=16. In step 811, the UE determines NPDCCH monitoring length R based on Rmax and the received radio signal quality SNR. Parameter Rmax can be obtained via signaling from the serving base station. Parameter SNR can be obtained via UE measurement and estimation. In step 812, the UE tries to decode NPDCCH after received R subframes for every Rmax/8 subframes, starting from the beginning of the NPDCCH search space. In step 813, the UE checks if the CRC is OK for the DCI decoding. If the answer is yes, then the UE goes to step 814 and stops NPDCCH decoding and turns off the RF receiving chain until the following operation, e.g., data transmission and reception for NPDSCH, synchronization etc. If the answer is no, then the UE goes to step 815 and stops NPDCCH monitoring and partially turns off the RF receiving chain. The UE only monitors NRS/NPSS/NSSS to maintain synchronization and channel estimation. In step 816, after Rmax/8 subframes, the UE goes to the next blind decoding interval and starts with the next Rmax/8 subframes for NPDCCH monitoring in step 811.

Figure 9:
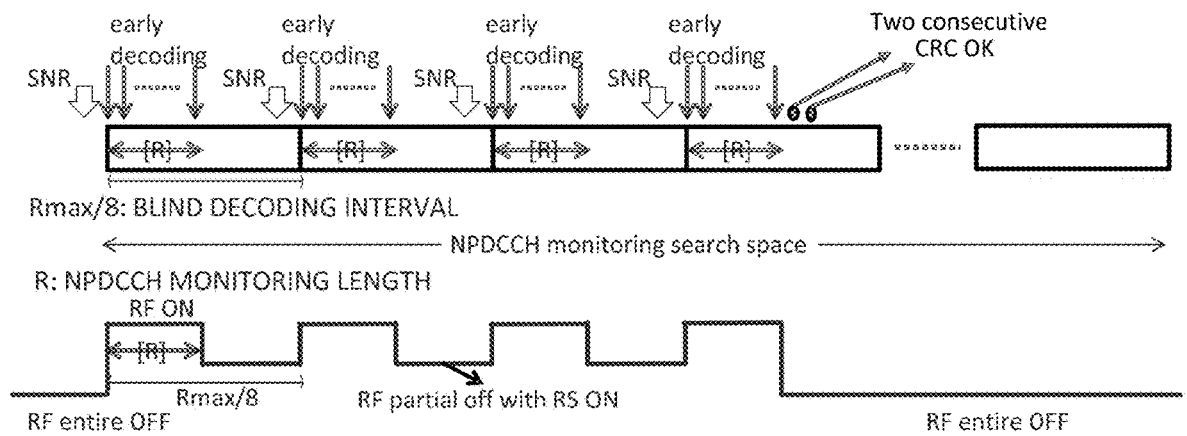
FIG. 9 illustrates a third embodiment of NPDCCH monitoring with early decoding and reduced monitoring.

FIG. 9 illustrates a third embodiment of NPDCCH monitoring with early decoding and reduced monitoring. In the third embodiment, the early decoding and reduced monitoring are integrated for NPDCCH monitoring. As depicted by FIG. 9, the UE RF is entire OFF before starting NPDCCH monitoring. The NPDCCH monitoring search space contains Rmax subframes and is divided into eight NPDCCH blind decoding intervals, each has Rmax/8 subframe(s). For each blind decoding interval, the UE RF is entire ON for the PDCCH monitoring length, e.g., the first R subframes and the UE monitors NPDCCH accordingly. Before the end of the R subframes, the UE performs early decoding every N subframes. After R subframes, the UE RF is partial OFF for the remaining Rmax/8-R subframes and the UE stops monitoring NPDCCH. The UE only performs essential synchronization and channel estimation functionally during partial OFF to save power consumption. The UE RF is entire OFF upon successfully decoding of NPDCCH, e.g., upon the UE detects two consecutive CRC OK.

Figure 10:
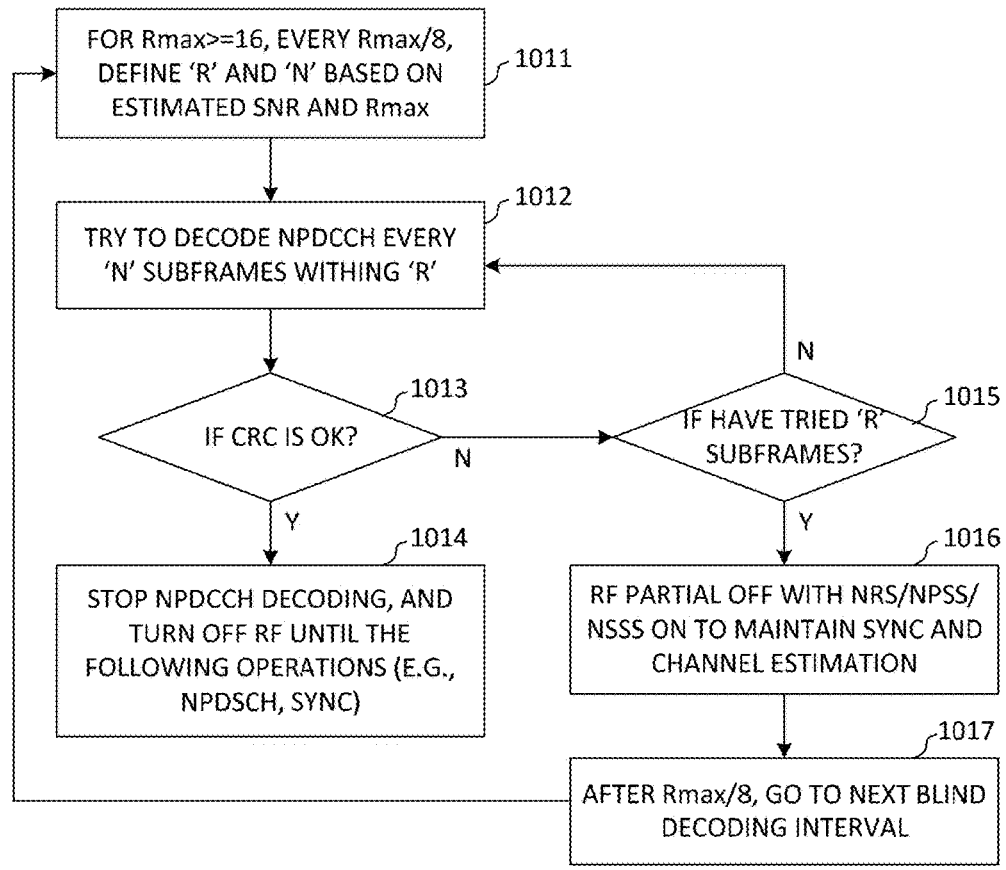
FIG. 10 is a flow chart of early decoding and reduced monitoring for NPDCCH monitoring.

FIG. 10 is a flow chart of early decoding and reduced monitoring for NPDCCH monitoring by a UE when the maximum repetition number Rmax>=16. In step 1011, the UE determines NPDCCH monitoring length R and early decoding parameter N based on Rmax and the received radio signal quality SNR. Parameter Rmax can be obtained via signaling from the serving base station. Parameter SNR can be obtained via UE measurement and estimation. In step 1012, the UE tries to decode NPDCCH for every N subframes within R subframes, starting from the beginning of the NPDCCH search space. In step 1013, the UE checks if the CRC is OK for the DCI decoding. If the answer is yes, then the UE goes to step 1014 and stops NPDCCH decoding and turns off the RF receiving chain until the following operation, e.g., data transmission and reception for NPDSCH, synchronization etc. If the answer is no, then the UE goes to step 1015 and checks if the UE has received R subframes. If the answer is no, then the UE goes back to step 1012. If the answer is yes, then in step 1016, the UE stops NPDCCH monitoring and partially turns off the RF receiving chain. The UE only monitors NRS/NPSS/NSSS to maintain synchronization and channel estimation. In step 1017, after Rmax/8 subframes, the UE goes to the next blind decoding interval and starts with the next Rmax/8 subframes for NPDCCH monitoring in step 1011.

Figure 11:
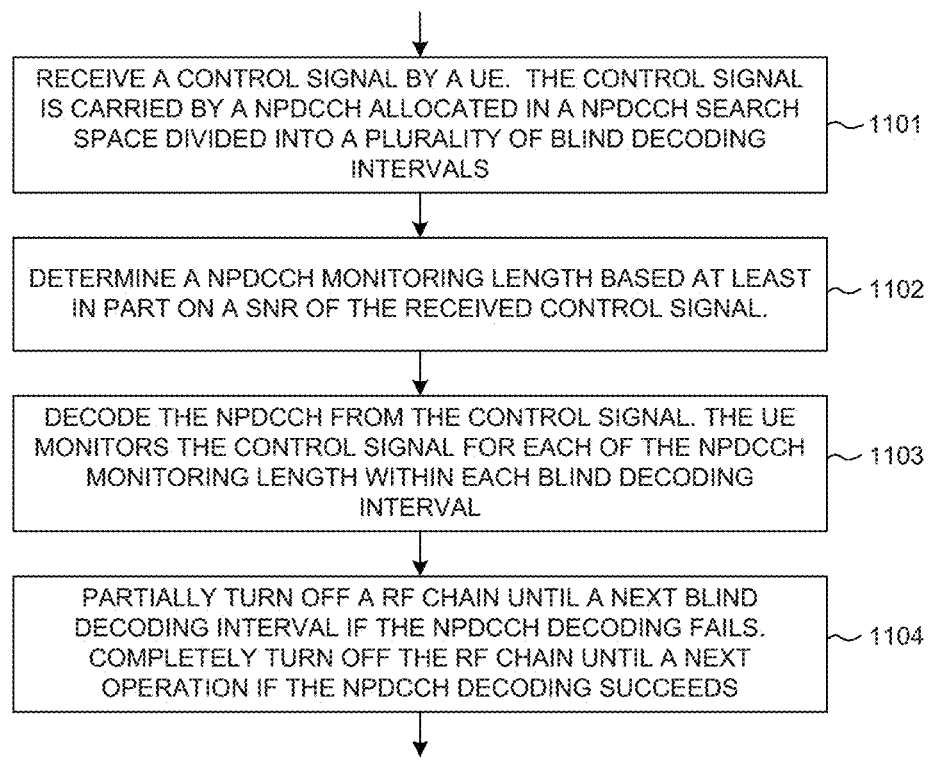
FIG. 11 is a flow chart of a method of NPDCCH monitoring in accordance with one novel aspect.

FIG. 11 is a flow chart of a method of NPDCCH monitoring by a user equipment in accordance with one novel aspect. In step 1101, the UE receives a control signal. The control signal is carried by a narrowband physical downlink control channel (NPDCCH) allocated in a NPDCCH search space divided into a plurality of predefined blind decoding intervals. In step 1102, the UE determines a NPDCCH monitoring length based at least in part on a signal to noise ratio (SNR) of the received control signal. In step 1103, the UE decodes the NPDCCH from the control signal. The UE monitors the control signal for each of the NPDCCH monitoring lengths within each blind decoding interval. In step 1104, the UE partially turns off a radio frequency (RF) chain until a next blind decoding interval if the NPDCCH decoding fails, and the UE completely turns off the RF chain until a next operation if the NPDCCH decoding succeeds.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
receiving a control signal by an antenna of a user equipment (UE), wherein the control signal is carried by a narrowband physical downlink control channel (NPDCCH) allocated in a NPDCCH search space divided into a plurality of blind decoding intervals;
determining early decoding instances based at least in part on a signal to noise ratio (SNR) of a received radio signal;
decoding the NPDCCH from the control signal by a decoder of the UE at every early decoding instance during each NPDCCH monitoring length before the decoding succeeds; wherein the UE monitors the control signal inside an NPDCCH monitoring length for each blind decoding interval; and
partially turning off a radio frequency (RF) chain of the UE outside the NPDCCH monitoring length until a next blind decoding interval when the decoding fails, and completely turning off the RF chain of the UE until a next operation when the decoding succeeds.

2. The method of claim 1, wherein the NPDCCH monitoring length is determined based at least in part on the signal to noise ratio (SNR) of the received radio signal.

3. The method of claim 2, wherein the NPDCCH monitoring length when the SNR is greater than a predefined threshold is shorter than the NPDCCH monitoring length when the SNR is not greater than the predefined threshold.

4. The method of claim 1, wherein the NPDCCH search space contains a maximum number of repetition (Rmax) for NPDCCH candidates, and wherein one of the plurality of blind decoding intervals contains Rmax/8, Rmax/4, Rmax/2, or Rmax number of subframes.

5. The method of claim 1, wherein the UE performs synchronization and channel estimation functionalities during the partial turning off.

6. The method of claim 5, wherein the partial turning off involves turning on the RF chain to receive reference signals and synchronization signals and otherwise turning off the RF chain.

7. The method of claim 1, wherein an early decoding interval when the SNR is greater than a predefined threshold is shorter than the early decoding interval when the SNR is not greater than the predefined threshold.

8. The method of claim 1, wherein the decoding fails when a cyclic redundancy check (CRC) fails, and wherein the decoding succeeds when two consecutive CRCs are OK.

9. A user equipment (UE) comprising:
an antenna that receives a control signal, wherein the control signal is carried by a narrowband physical downlink control channel (NPDCCH) allocated in a NPDCCH search space divided into a plurality of blind decoding intervals;
a decoder that decodes the NPDCCH from the control signal, wherein the UE monitors the control signal inside an NPDCCH monitoring length for each blind decoding interval; and
a radio frequency (RF) chain configured to be partially turned off outside the NPDCCH monitoring length until a next blind decoding interval when the decoding fails, and the RF chain is configured to be completely turned off until a next operation when the decoding succeeds.

10. The UE of claim 9, further comprising:
a controller that determines the NPDCCH monitoring length based at least in part on a signal to noise ratio (SNR) of a received radio signal.

11. The UE of claim 10, wherein the NPDCCH monitoring length when the SNR is greater than a predefined threshold is shorter than the NPDCCH monitoring length when the SNR is not greater than the predefined threshold.

12. The UE of claim 9, wherein the NPDCCH search space contains a maximum number of repetition (Rmax) for NPDCCH candidates, and wherein one of the plurality of blind decoding intervals contains Rmax/8, Rmax/4, Rmax/2, or Rmax number of subframes.

13. The UE of claim 9, wherein the UE performs synchronization and channel estimation functionalities during the partial turning off.

14. The UE of claim 13, wherein the partial turning off the RF chain by the UE involves turning on the RF chain to receive reference signals and synchronization signals by the antenna of the UE and otherwise turning off the RF chain.

15. The UE of claim 9, wherein the UE determines early decoding instances based at least in part on a signal to noise ratio (SNR) of a received radio signal, and wherein the UE decodes the NPDCCH at every early decoding instance during each NPDCCH monitoring length before the decoding succeeds.

16. The UE of claim 15, wherein an early decoding interval when the SNR is greater than a predefined threshold is shorter than the early decoding interval when the SNR is not greater than the predefined threshold.

17. The UE of claim 9, wherein the decoding fails when a cyclic redundancy check (CRC) fails, and wherein the decoding succeeds when two consecutive CRCs are OK.

* * * * *